TIMED ELECTRICAL SYSTEM

Filed May 11, 1948 2 Sheets-Sheet 1

Inventor
Loren O. Grainger
By [signature]
Attorney

Jan. 10, 1950 L. O. GRAINGER 2,494,121

TIMED ELECTRICAL SYSTEM

Filed May 11, 1948 2 Sheets-Sheet 2

Inventor
Loren O. Grainger
By
Attorney

Patented Jan. 10, 1950

2,494,121

UNITED STATES PATENT OFFICE 2,494,121

TIMED ELECTRICAL SYSTEM

Loren O. Grainger, South Gate, Calif.

Application May 11, 1948, Serial No. 26,321

13 Claims. (Cl. 171—97)

Figures 1, 2, 3, 4:
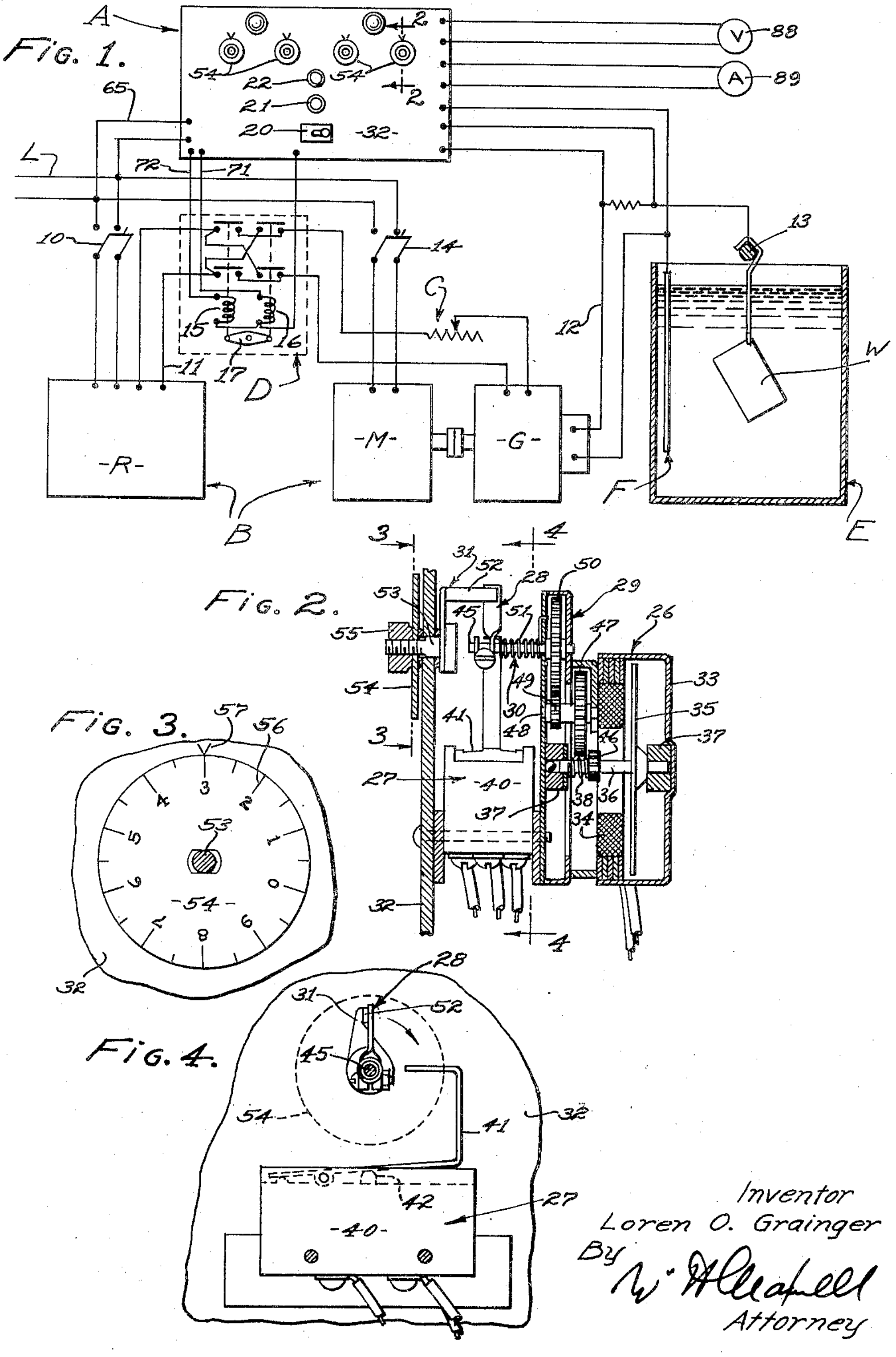

This invention has to do with a timed electrical system and it is a general object of the invention to provide a system or circuit providing for a series of operations in predetermined timed relation.

The present invention is concerned generally with the provision of an electrical system or circuit by which a series or sequence of operations is gained in a predetermined time relation, each of which time elements may be varied at will. The broader aspects of the invention are applicable to various situations or operating conditions. However, the invention is particularly suited to and practical for controlling electroplating and, therefore, I have in this disclosure, set forth a typical form and application of the invention and have related it specifically to a typical electroplating system.

Ordinary electroplating utilizes direct current under low voltage and high amperage and for rapid plating action the amperage is increased. When high amperage is used a rapid plating action occurs, but inferior plating results, in that the material deposited after a short interval under high amperage is usually porous and undesirable. It has been found that high amperage can be used for a limited period of time and it is advantageous to follow such operation by a reverse in the direction of flow of the plating current in such manner as to remove a portion of the plate material, that is, that portion which tends to be soft or porous. By alternate operations, that is, by a series of operations alternately applying and removing plating high amperage can be successfully employed and satisfactory results obtained. It is important, however, that the time intervals in such an operation be carefully related as otherwise the desired results cannot be obtained.

It is a general object of the present invention to provide a plating circuit involving a timer that controls the circuit to reverse it at predetermined intervals and for predetermined lengths of time. With the present invention the plating circuit is reversed a predetermined number of times during a full cycle of operation and the time intervals that occur during the operation may be related so that the desired results are obtained.

It is another object of the present invention to provide a time control for governing a circuit to effect predetermined reversal thereof at predetermined times, which control includes or involves provision for adjustment of the time intervals so that they can be quickly and easily varied at will. With the present invention any one time interval involved in the operation may be adjusted, either shortened or lengthened, as circumstances require, without requiring adjustment or variation of the other intervals.

It is another object of the present invention to provide a time control of the general character referred to in which each operation or function is initiated only upon completion of the preceding function, with the result that the system operates so that each function can occur only after the preceding functions have been fully and properly completed.

Figure 5:
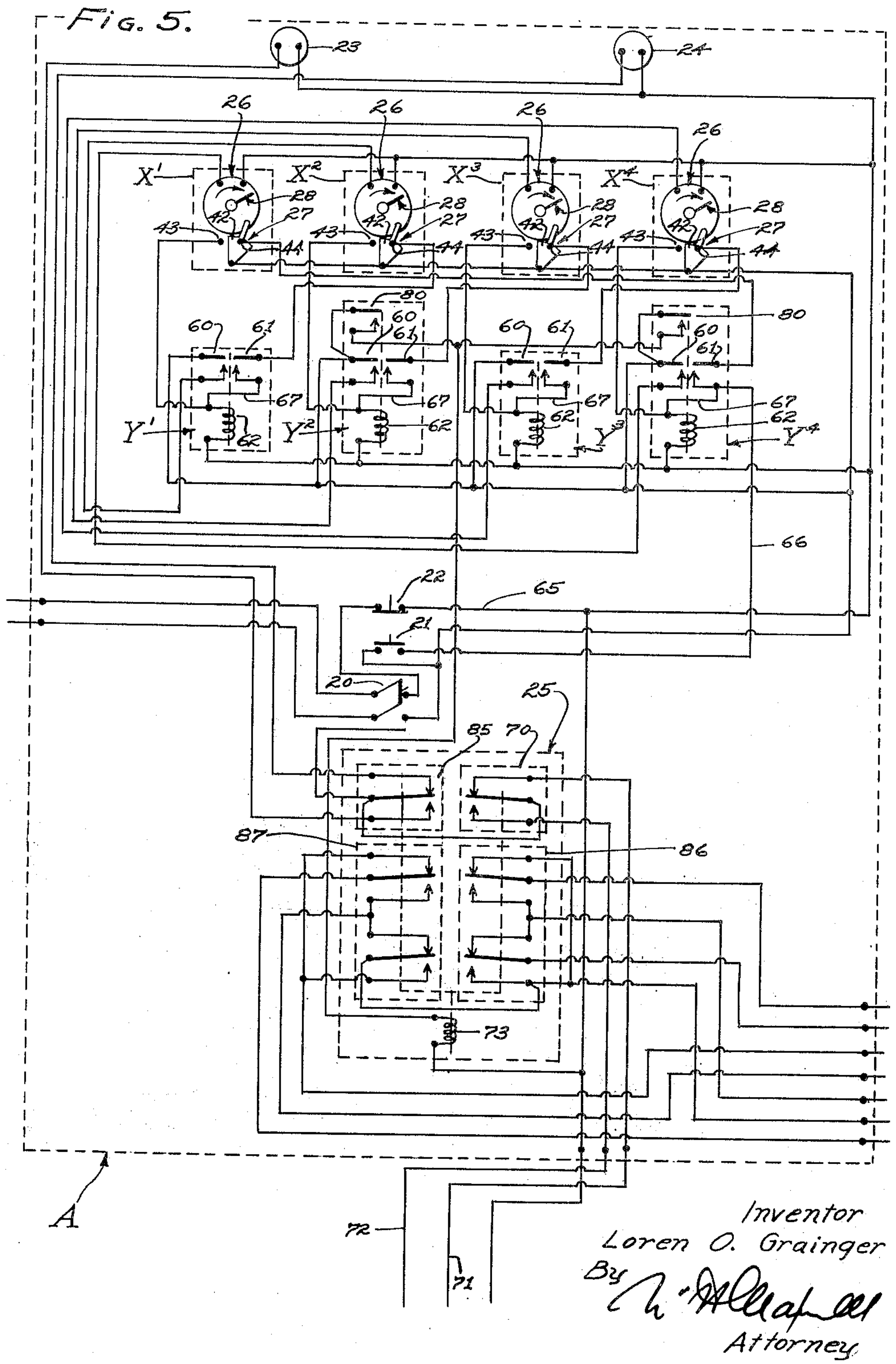

The various objects and features of my invention will be fully understood from the following detailed description of a typical preferred form and application of my invention, throughout which description reference is made to the accompanying drawings, in which:

Fig. 1 is a general diagram of the system provided by the present invention, showing the timing apparatus of the present invention combined with a typical or conventional plating circuit. Fig. 2 is an enlarged detailed sectional view of a portion of the timing apparatus, being an enlarged view taken as indicated by line 2—2 on Fig. 1. Fig. 3 is an enlarged sectional view taken as indicated by line 3—3 on Fig. 2. Fig. 4 is a sectional view taken as indicated by line 4—4 on Fig. 2, and Fig. 5 is a diagrammatic view showing, in particular, the timing system provided by the present invention.

The particular embodiment of the invention illustrated in the drawings involves, generally, a time control A, a power supply B, a current regulator C, a reversing switch D, a tank E carrying a suitable electrolite, an electrode F in the tank E submerged in the electrolite, a unit of work W suspended in the electrolite to form the other of opposite electrode, and various features and connections all of which will appear from the following description.

The power supply B may be any suitable means supplying direct current for application to the electrodes in the tank E. In the particular case illustrated the entire system is supplied with alternating current from a power line L and the power supply B involves, generally, a motor generator set having a motor M, driven by alternating current, and a generator G driven by the motor and having a field excited by a rectifier R. In the particular case illustrated the rectifier R is supplied from the main power line L through a switch 10 and the output from the rectifier R is carried by a line 11 which extends to the generator where it excites the field windings thereof.

The reversing switch D and the control C are coupled in the line 11. The direct current output from the generator G is handled by a line 12 one side of which connects to the electrode F while the other side connects to a bus bar 13 from which the work W may be suspended so that it is submerged in the electrolite within the tank 11. The power line L serves the motor M through a suitable switch 14.

The current regulator C governs the output of the direct current generator G by governing the field of the generator. In the case illustrated the current regulator C is a variable resistance or rheostat in the line 11 from the rectifier to the field of the generator.

The reversing switch D coupled in the line from the rectifier to the field of the generator G is actuated by or is under control of the time control A and it may be any suitable switch construction having two positions and which is operable to reverse the polarity of the field of generator G. It will be apparent from Fig. 1 of the drawings how the reversing switch D may be coupled in the line 11 and may be provided with contacts and connections so that the constant polarity delivered by the rectifier R may be reversed as desired by suitable operation of the reversing switch. The particular reversing switch illustrated involves two operating coils 15 and 16 and the switching mechanisms of the switch are coupled by a mechanical link 17 so that the reversing switch is in one position when coil 15 is energized and is in the opposite position when the coil 16 is energized.

The time control A involves, generally, a plurality of like timers $X^1$, $X^2$, $X^3$ and $X^4$, a plurality of switching devices $Y^1$, $Y^2$, $Y^3$ and $Y^4$, a main or master switch 20, an on switch 21, and an off switch 22. The time control may also involve auxiliary elements such as signal lights 23 and 24 and in the particular case illustrated it involves a relay 25 through which the action of the elements just mentioned is relayed to the reversing switch D. The particular apparatus illustrated in the drawings further includes various indicating instruments such as voltmeters and ammeters which are related to the principal elements of the time control through the relay 25.

The several timers of the time control may be alike and in the form of the invention illustrated each timer includes, generally, a motor 26, a control switch 27, an operator 28 for the switch, a drive 29 coupling the motor and the operator, restoring means 30 for the operator and setting means 31 for the operator.

The motor 26 is shown suitably supported at the rear of the main instrument panel 32 and is shown as including a motor case 33, a field winding 34, an armature 35 carried by a shaft 36 to rotate and to shift axially relative to the field and bearings 37 carried by the case and supporting the shaft 36. In the particular case illustrated a spring 38 normally yieldingly holds the armature away from the field and when the field is energized the armature shifts axially toward the field but not into contact with it, and rotates adjacent the field. The time control is energized from the main line L carrying alternating current and the motor 26 is a synchronous motor such as to operate at a predetermined speed when energized, as hereinafter described.

The control switch 27 is suitably mounted at the rear of the panel 32 and is shown as including a suitable housing or case 40 carrying suitable contacts and supporting an operating lever 41 which serves to operate the movable contact 42 of the switch. The movable contact 42 is such as to operate between two positions, and when in one position it engages stationary contact 43 while in the other position it engages stationary contact 44. When the movable contact 42 engages stationary contact 43 a starting circuit is closed, whereas when the movable contact 42 engages stationary contact 44 a stop circuit is closed. When contact 42 is disengaged from contact 44 the stop circuit is opened thereby stopping the motor 26 of the timer. The relationship of the parts of switch 27 is such that the movable contact 42 normally engages stationary contact 44 and when the switch 27 is operated, as by actuation of the operator 28, the movable contact is moved to engage the stationary contact 43.

In accordance with the present invention the action of the switch 27 in controlling the circuits just referred to is overlapped so that there is a period in the course of operating the movable contact between the stationary contacts when both stationary contacts are simultaneously engaged by the movable contact. In other words the switch completes the starting circuit before it releases the stopping circuit.

The operator 28 is a shiftable element, preferably a pivoted arm carried on an operating shaft 45 supported for rotation. The operator or operating arm 28 swings between an unactuated position where it is removed from the movable contact 42 of the switch 27 and an operated position where it engages and actuates the movable contact 42 of the switch 27.

The drive 29 between the motor shaft 36 and the operating shaft 45 is a clutched drive and preferably involves a suitable speed reduction. The particular drive illustrated in the drawings is a gear drive and involves a drive pinion 46 fixed on the motor shaft 36 to be shiftable into and out of driving engagement with a gear 47 on a countershaft 48. The spring 38 normally holds shaft 36 in position where the pinion is disengaged from the gear 47. However, when the motor is energized and the armature is shifted axially the pinion 46 meshes with and drives the gear 47. A pinion 49 is operated by the countershaft 48 and engages and drives a gear 50 on the operating shaft 45.

The restoring means 30 acts to restore the operator or operating arm 28 to the unactuated position when the drive 29 is released through disengagement of the pinion 46 from the gear 47. In the case illustrated the means 30 involves a spring 51 carried on shaft 45 having one end anchored to the motor case 33 while the other end engages the arm 28. The relationship of parts is such that the spring is put under tension as the arm 28 operates away from the unactuated position and when the drive is released the spring effectively returns the arm to the unactuated position.

The setting means 31 involves generally a movable stop 52 that is shiftable to various positions and which serves as a stop for the operating arm 28 and determines the unactuated position of the arm 28. In the particular case illustrated the stop 52 is carried by a rotatable shaft 53 which projects through the panel 32 and a dial 54 is fixed on the shaft 53 at the front of the panel. By rotating the dial the shaft 53 is rotated and the position of the stop 52 is varied. In the particular case illustrated a means is provided for setting or fixing the stop mechanism against operation or shifting. I have shown the forward end of shaft 53 threaded and carrying a clamp nut 55. When the dial has been set to rotate the stop 52 in the desired position the nut is tightened, clamping the means 31 against shifting. It is to be understood that a suitable scale or graduations 56 may be provided on the dial 54 to cooperate with a reference mark 57 on the panel 32 so that the position of the stop 52 can be readily ascertained.

The switching devices $Y^1$, $Y^2$, $Y^3$ and $Y^4$ are related to the several timers $X^1$, $X^2$, $X^3$ and $X^4$ so that closing or operation of switching device $Y^1$ initiates operation of timer $X^2$ while closing or operation of switching device $Y^2$ initiates operation of timer $X^3$ while closing or operating of switching device $Y^3$ initiates operation of timer $X^4$, while closing or operation of switching device $Y^4$ initiates operation of timer $X^1$.

Each switching device or mechanism includes a motor switch 60 and a holding switch 61, both under control of a winding 62. The winding 62 of switching device $Y^1$ is in the starter circuit controlled by timer $X^1$ while the winding 62 of switching device $Y^2$ is in the starter circuit controlled by timer $X^2$, while the winding 62 of switching device $Y^3$ is controlled by the starter circuit of timer $X^3$, while the winding 62 of switching device $Y^4$ is controlled by the starter circuit of timer $X^4$. It may therefore be said that the switching device $Y^1$ is related to or under control of timer $X^1$ while the switching device $Y^2$ is related to or under control of timer $X^3$, while switching device $Y^4$ is related to or under control of timer $X^4$.

In the particular case illustrated I have shown but four timers and related switching devices, whereas it will be apparent that any suitable number of such units or elements may be employed. Further, in the particular case illustrated the timers are such as to operate in the sequence in which they are illustrated in the diagram, Fig. 5, that is, timer $X^1$ operates first, timer $X^2$ operates next, timer $X^3$ follows timer $X^2$ and timer $X^4$ follows timer $X^3$. Unless the circuit is interrupted, as by opening the off switch 22, the cycle of operation repeats itself.

The off switch 22 is coupled in one of the leads 65 of the power line L so that when the switch 22 is opened the entire circuit of the time control is dropped or opened and all of the windings of the switch mechanisms above described are deenergized. Since it is desired that the cycle of operations start with operation of timer $X^1$ the on switch 21 is provided in a line 66 which is so connected with the main power line L that when the switch 21 is closed the winding 62 of switch mechanism $Y^4$ is energized with consequent closing of the motor switch 60 of $Y^4$, the closing of which switch initiates energization of the motor of timer $X^1$.

The energization of winding 62 of a switching mechanism such as the mechanism $Y^4$ not only closes the motor switch 60 but also closes the holding switch 61 which, through a suitable connection 67, provides a connection through the winding 62 of that particular switching mechanism and through the stop switch 44 of the next or following timer. For instance when the motor switch 60 of switch mechanism $Y^4$ closes the holding switch 61 of that mechanism closes and the winding 62 of that mechanism is maintained energized through the stop switch 44 of timer $X^1$. With the motor of timer $X^1$ energized, that timer proceeds to operate until such time as the switch 27 thereof is actuated, whereupon the stop circuit through contact 44 of timer $X^1$ is opened and starting circuit through contact 43 of that timer is closed, these operations overlapping so that the circuit is not dropped or opened as a result of the operation. When the start circuit through contact 43 of timer $X^1$ closes the next succeeding or following timer is put in operation. This occurs through energization of the winding 62 of switch mechanism $Y^1$ with consequent closing of the motor switch of switch mechanism $Y^1$ which in turn controls the motor of timer $X^2$.

It will be apparent from the foregoing description how the operation progresses from one timer through its switch mechanism to the next timer so that the time control proceeds through a complete cycle or operation under successive control of the timers and how the time interval during which it is subject to any one timer depends upon the setting of the operating member of that timer governed by the setting means 31 thereof. If the operating arm of a timer is set so that it has to move but a short distance after the motor of the timer starts operation, the time interval will be short, whereas if it has to move a great distance, the time interval will be long.

When the invention is being carried out in connection with a typical reversible plating circuit and it is desired that the flow in that circuit be reversed from time to time, or at predetermined time intervals, the desired reversing of the plating circuit can be gained by periodic operation of the reversing switch D in the plating circuit. As above described the reversing switch D controls the exciting circuit of the direct current generator G, and in the particular case illustrated the reversing switch D involves the windings or coils 15 and 16. When coil 15 is energized flow is in one direction, whereas when coil 16 is energized flow is in the opposite direction.

In the form of the invention illustrated in the drawings the relay 25 includes a switch 70 which is normally in one position where it closes a circuit through a line 71 controlling energization of coil 16. When the switch 70 is operated it closes a circuit through line 72 that controls energization of coil 15. The relay 25 has an operating coil 73 which when energized operates the switch 70 from the normal position where coil 16 is energized to the operated position where coil 15 is energized. In the particular case illustrated it is desired that coil 16 be energized while timers $X^1$ and $X^3$ are operating, whereas it is desired that coil 15 be energized while timers $X^2$ and $X^4$ are operating. This being the case the switch mechanisms related to timers $X^2$ and $X^4$, namely the mechanisms $Y^2$ and $Y^4$ are provided with relay controlling switches 80 which are closed when the windings 62 of such switch mechanisms are energized and when closed they complete circuits through the operating coil 73 of relay 25 causing switch 70 to be operated.

As a result of the general arrangement and relationship of parts just described when timer $X^1$ is operating relay 25 is unactuated and switch 70 is in its normal condition closing the circuit through winding 16 of reversing switch D. When the switch of timer $X^1$ operates timer $X^2$ starts operation and as timer $X^2$ operates switch 80 of its related switching mechanism $Y^2$ is closed and the relay 25 is energized so that winding 15 of the reversing switch is energized and consequently the reversing switch is reversed from the preceding condition. When the switch of timer $X^2$ operates the timer $X^3$ starts operation and the relay 25 is unactuated so that switch 70 returns to its unactuated condition closing the circuit through the winding 16 of the reversing switch D. When the timer switch of timer $X^3$ operates the timer $X^4$ starts operation and the switch 80 of switch mechanism $Y^4$ closes energizing the relay 25 and operating switch 70 so that the winding 15 of the reversing switch is energized, causing reversal of switch D. When the switch of timer $X^4$ operates the cycle has been completed and a new cycle starts with the operation of timer $X^1$.

The particular relay 25 is shown as including a switch 85 controlling circuits to the signal lamps 23 and 24 so that one lamp is energized when the relay is open while the other is energized when the relay is closed. Other switches 86 and 87 are included in the relay 25 and are such as to suitably govern circuits to voltmeters and ammeters 88 and 89, respectively, so that the condition of the plating circuit can be determined at any time during operation of the apparatus.

From the foregoing description it will be apparent that through the present invention the reversing switch in the plating circuit or controlling the exciting field of the direct current generator is effectively controlled by the timers of the time control and the timers and their related switch mechanisms are so coupled that they immediately succeed each other in operation or slightly overlap each other in operation, to the extent that the circuit is never opened or dropped and the operation or time interval for each timer can be individually adjusted at will without requiring adjustment or compensation of other parts of the system.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A system of the character described including, a single unit to control, a plurality of timers operating in succession and controlling said unit and each having a motor and a switch operated thereby, and a plurality of switch mechanisms, one related to each timer and each including a switch controlling the motor of the succeeding timer and operated by operation of the switch of the related timer.

2. A system of the character described including, a single controllable unit, a plurality of timers controlling said unit and operating in succession and each having a motor and a switch operated thereby, and a plurality of switch mechanisms governing said unit, one mechanism being related to each timer and each mechanism including a switch controlling the motor of the succeeding timer and operated by operation of the switch of the related timer.

3. A system controlling electric equipment including, a plurality of timers operating in succession and each having a switch, a variable actuator for the switch and a motor operating the actuator, and a plurality of switch mechanisms governing said equipment, one mechanism being related to each timer and each mechanism including a switch controlling the motor of the succeeding timer and operated by operation of the switch of the related timer, the actuators of the timers being individually variable.

4. A system controlling electric equipment including, a plurality of timers, means coupling the timers in a closed system to operate in succession, each timer having a switch, an actuator for the switch, a variable stop stopping the actuator in an unactuated position, and a motor operating the actuator from said position to operate the switch, and a plurality of switch mechanisms governing said equipment, one mechanism being related to each timer and each mechanism including a switch controlling the motor of the succeeding timer and operated by operation of the switch of the related timer.

5. A system controlling electric equipment including, an assembly of a plurality of timers connected to operate in succession and a plurality of stop and start circuits, each timer having a switch, an actuator for the switch, a variable stop stopping the actuator in an unactuated position, and a synchronous motor operating the actuator, the switch closing a stop circuit when in an unactuated position for holding the motor in operation and closing a start circuit when actuated for initiating operation of the motor of the succeeding timer, and a plurality of switch mechanisms governing said equipment, one related to each timer and each including a motor switch controlling the motor of the succeeding timer and including a coil operating the motor switch and controlled by the stop circuit of the succeeding timer.

6. A system controlling electric equipment including, an assembly of a plurality of timers connected to operate in succession and a plurality of stop and start circuits, each timer having a switch, an actuator for the switch, a variable stop stopping the actuator in an unactuated position, and a synchronous motor operating the actuator, the switch closing a stop circuit when in an unactuated position for holding the motor in operation and closing a start circuit when actuated for initiating operation of the motor of the succeeding timer, and a plurality of switch mechanisms governing said equipment, one related to each timer and each including a motor switch controlling the motor of the succeeding timer, a coil in the stop circuit operating the motor switch and controlled by the switch of the succeeding timer, and a holding switch in the circuit closed when the coil is energized.

7. A system controlling electric equipment including, an assembly of a plurality of timers connected to operate in succession and a plurality of stop and start circuits, each timer having a switch, an actuator for the switch, a variable stop stopping the actuator in an unactuated position, and a synchronous motor operating the actuator, the switch closing a stop circuit when in an unactuated position for holding the motor in operation and closing a start circuit when actuated for initiating operation of the motor of the succeeding timer, and a plurality of switch mechanisms governing said equipment, one related to each timer and each including a motor switch controlling the motor of the succeeding timer, a coil in the stop circuit operating the motor switch and controlled by the switch of the succeeding timer, and a holding switch in the circuit closed when the coil is energized, the said holding circuit being in series with the stop switch of the succeeding timer.

8. A system controlling electric equipment including, an assembly of a plurality of timers connected to operate in succession and a plurality of stop and start circuits, each timer having a switch, an actuator for the switch, a variable stop stopping the actuator in the unactuated position, and a synchronous motor operating the actuator, the switch closing a stop circuit when in an unactuated position for holding the motor in operation and closing a start circuit when actuated for initiating operation of the motor of the succeeding timer, and a plurality of switch mechanisms governing said equipment, one related to each timer and each including a motor switch controlling the motor of the succeeding timer, the stop switch in a holding circuit with the switch of the succeeding timer, and an operating coil simultaneously operating the motor and holding switches and energized upon closing of the start circuit of the related timer.

9. A system controlling electric equipment including, an assembly of a plurality of timers connected to operate in succession and a plurality of stop and start circuits, each timer having a switch, an actuator for the switch, a variable stop stopping the actuator in the unactuated position, and a synchronous motor operating the actuator, the switch closing a stop circuit when in an unactuated position for holding the motor in operation and closing a start circuit when actuated for initiating operation of the motor of the succeeding timer, and a plurality of switch mechanisms governing said equipment, one related to each timer and each including a motor switch controlling the motor of the succeeding timer, the stop switch in a holding circuit with the switch of the succeeding timer, and an operating coil simultaneously operating the motor and holding switches and energized upon closing of the start circuit of the related timer, the actions of the start and stop circuits being overlapped.

10. A control for an electroplating system in which there is a circuit delivering direct plating current and a reversing switch effecting reversal of the polarity of said current including, a plurality of timers in a continuously operating system and operating in succession in said system, a plurality of switch mechanisms one related to each timer and initiating operation of the succeeding timer, and switches operated by certain of said mechanisms controlling the reversing switch.

11. A control for an electroplating system having a circuit delivering direct plating current and a reversing switch effecting reversal of the polarity of said current including, a plurality of timers operating in succession in a continuously operating system, and a plurality of switch mechanisms one related to each timer and each actuated by the related timer and initiating operation of the succeeding timer, alternate mechanisms having switches controlling operation of the reversing switch.

12. A control for an electroplating system having a circuit delivering direct plating current and a reversing switch effecting reversal of the polarity of said current including, a plurality of timers operating in succession in a continuously operating system, a relay, and a plurality of switch mechanisms one related to each timer and each actuated by the related timer and initiating operation of the succeeding timer, alternate mechanisms having switches controlling operation of the reversing switch through the relay.

13. A system of the character described including, a single unit subject to control, a plurality of timers, means coupling the timers in a closed series to operate in succession, each timer controlling said unit and including a motor and a switch operated thereby, and a plurality of switch mechanisms, one related to each timer and each including a switch controlling the motor of the succeeding timer and operated by operation of the switch of the related timer.

LOREN O. GRAINGER.

REFERENCES CITED

The following references are of record in the file of this patent:

UNITED STATES PATENTS

| Number | Name | Date |
|---|---|---|
| 1,821,205 | Carver | Sept. 1, 1931 |
| 1,947,263 | Hunter | Feb. 13, 1934 |
| 2,096,626 | Crago | Oct. 19, 1937 |
| 2,158,887 | Sweet | May 16, 1939 |
| 2,216,167 | Fisher | Oct. 1, 1940 |
| 2,228,436 | Blankenbuehler | Jan. 14, 1941 |
| 2,244,880 | Howse | June 10, 1941 |
| 2,290,732 | Blett | July 21, 1942 |